(12) United States Patent
Glassberg

(10) Patent No.: US 10,137,916 B1
(45) Date of Patent: Nov. 27, 2018

(54) MODULAR FISHING EQUIPMENT CART

(71) Applicant: David Glassberg, Woodbury, NJ (US)

(72) Inventor: David Glassberg, Woodbury, NJ (US)

( * ) Notice: Subject to any disclaimer, the term of this patent is extended or adjusted under 35 U.S.C. 154(b) by 0 days.

(21) Appl. No.: 15/969,018

(22) Filed: May 2, 2018

(51) Int. Cl.
| B62B 3/02 | (2006.01) |
| B62B 3/00 | (2006.01) |
| B62B 3/04 | (2006.01) |
| B62B 13/18 | (2006.01) |
| B62B 3/10 | (2006.01) |

(52) U.S. Cl.
CPC ............... B62B 3/02 (2013.01); B62B 3/002 (2013.01); B62B 3/04 (2013.01); B62B 3/102 (2013.01); B62B 13/18 (2013.01); *B62B 2202/402* (2013.01)

(58) Field of Classification Search
CPC .. B62B 3/02; B62B 3/002; B62B 3/04; B62B 3/102
See application file for complete search history.

(56) References Cited

U.S. PATENT DOCUMENTS

| 5,893,572 | A | * | 4/1999 | Parks | B25H 1/04 |
| | | | | | 280/47.18 |
| 5,993,134 | A | * | 11/1999 | Williamson | B62B 1/14 |
| | | | | | 280/47.27 |
| 9,389,010 | B1 | * | 7/2016 | Booker, Sr. | B62B 3/02 |
| 9,655,307 | B2 | * | 5/2017 | Burmann | A01G 9/02 |
| 9,771,093 | B2 | * | 9/2017 | Horowitz | B62B 3/025 |
| 9,890,026 | B1 | * | 2/2018 | Bohamed | B62B 3/005 |
| 2004/0216339 | A1 | * | 11/2004 | Garberg | A47F 5/137 |
| | | | | | 40/308 |
| 2006/0232033 | A1 | * | 10/2006 | Pint | B62B 3/02 |
| | | | | | 280/79.2 |
| 2008/0238012 | A1 | * | 10/2008 | Carter | B62B 3/02 |
| | | | | | 280/47.35 |
| 2009/0051133 | A1 | * | 2/2009 | Oshiro | A63B 67/06 |
| | | | | | 280/47.18 |
| 2009/0101532 | A1 | * | 4/2009 | Huot | B25H 3/06 |
| | | | | | 206/379 |
| 2009/0309323 | A1 | * | 12/2009 | Oliver | B25H 3/00 |
| | | | | | 280/47.17 |
| 2010/0156069 | A1 | * | 6/2010 | Chen | B62B 3/007 |
| | | | | | 280/639 |
| 2011/0036907 | A1 | * | 2/2011 | Connelly | B62B 3/148 |
| | | | | | 235/383 |
| 2013/0026120 | A1 | * | 1/2013 | Johnson | A47B 55/02 |
| | | | | | 211/85.5 |
| 2013/0033014 | A1 | * | 2/2013 | Yang | B62B 3/02 |
| | | | | | 280/47.35 |

(Continued)

*Primary Examiner* — Erez Gurari
(74) *Attorney, Agent, or Firm* — Joseph E. Maenner; Petock & Petock, LLC

(57) ABSTRACT

A modular fishing equipment cart includes a frame having a first longitudinal side and a second longitudinal side extending parallel to the first longitudinal side. A front lateral side connects the first longitudinal side and the second longitudinal side and a rear lateral side also connects the first longitudinal side and the second longitudinal side. A plurality of wheels supports the frame for rolling the frame on the wheels. A rod holder assembly extends along the left longitudinal side. A plurality of hooks is co-linearly attached to the front lateral side. A magnetic holder is attached to the rear lateral side. Additional components are removably attachable to the frame.

25 Claims, 25 Drawing Sheets

(56) References Cited

U.S. PATENT DOCUMENTS

| | | | |
|---|---|---|---|
| 2013/0056462 A1* | 3/2013 | Furuta | B62B 3/006 |
| | | | 220/23.4 |
| 2014/0190077 A1* | 7/2014 | Burmann | A01G 9/02 |
| | | | 47/66.1 |
| 2017/0015340 A1* | 1/2017 | Fitzwater | B62B 3/022 |
| 2017/0096157 A1* | 4/2017 | Kubo | B62B 3/02 |
| 2017/0327139 A1* | 11/2017 | Thibault | B62B 3/02 |
| 2017/0341666 A1* | 11/2017 | Carzola | B62B 3/02 |
| 2018/0001919 A1* | 1/2018 | Grou | B62B 3/02 |
| 2018/0086358 A1* | 3/2018 | Bacallao | B62B 3/106 |

* cited by examiner

MODULAR FISHING EQUIPMENT CART

BACKGROUND OF THE INVENTION

Field of the Invention

The present invention relates to a cart that can be customized with modular accessories to store and transport fishing equipment.

Description of the Related Art

Typically, serious fishermen have a large volume of equipment that must be stored and transported from the home to a fishing site. Commercial racks, storage containers, and carts exist on the market for storing and transporting fishing gear. These racks, storage containers, and carts, do not provide much, if any, ability for an individual fisherman to customize them to meet the fisherman's particular needs.

It would be beneficial to provide a modular cart that can be custom accessorized by individual fishermen to meet their needs in storing and transporting their fishing gear.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a modular fishing equipment cart including a frame having a first longitudinal side and a second longitudinal side extending parallel to the first longitudinal side. A front lateral side connects the first longitudinal side and the second longitudinal side and a rear lateral side also connects the first longitudinal side and the second longitudinal side. A plurality of wheels supports the frame for rolling the frame on the wheels. A rod holder assembly extends along the left longitudinal side. A plurality of hooks is co-linearly attached to the front lateral side. A magnetic holder is attached to the rear lateral side.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
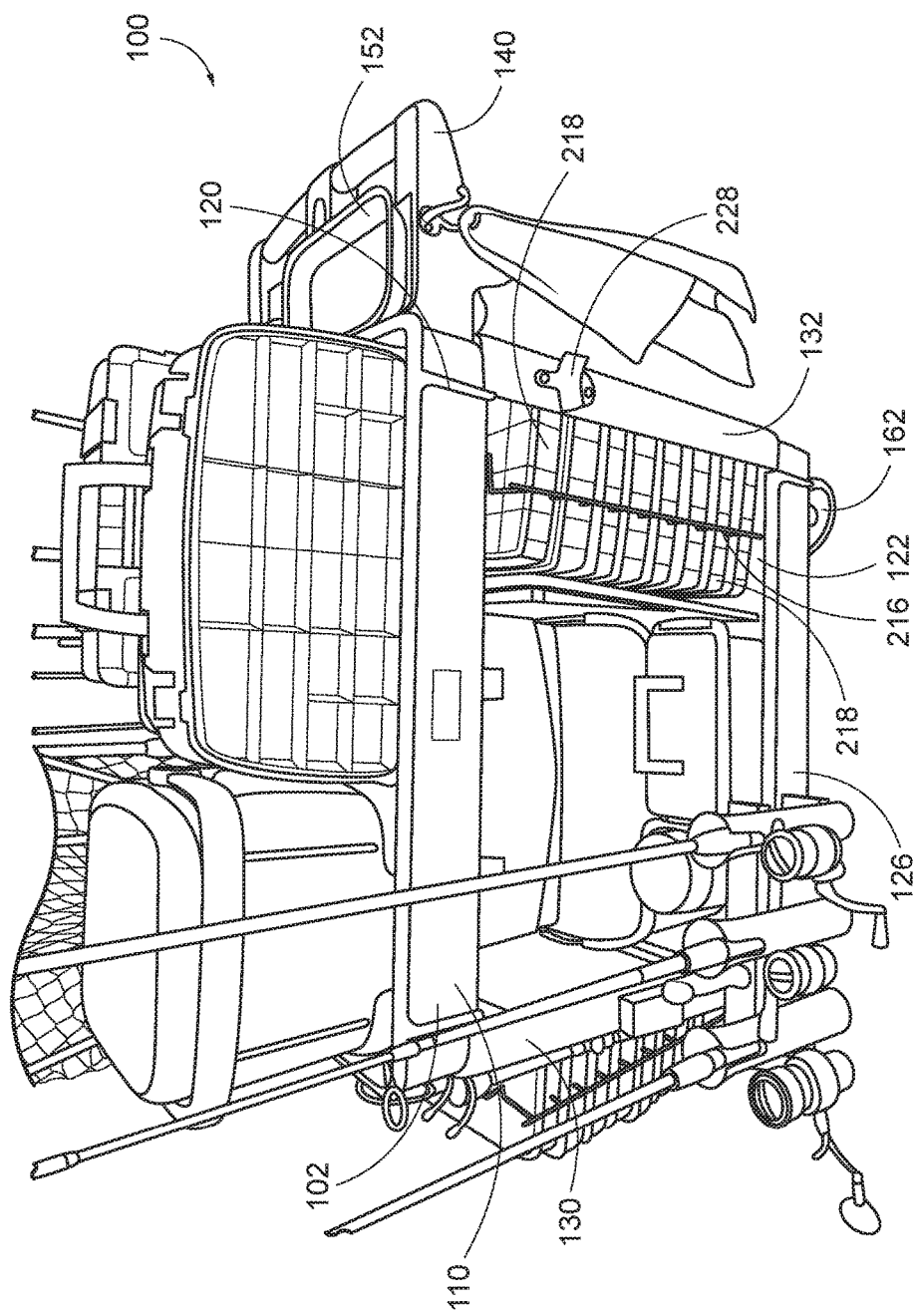
FIG. 1 is a side view of a modular fishing equipment cart according to an exemplary embodiment of the present invention, with the cart loaded with equipment.
Figure 2:
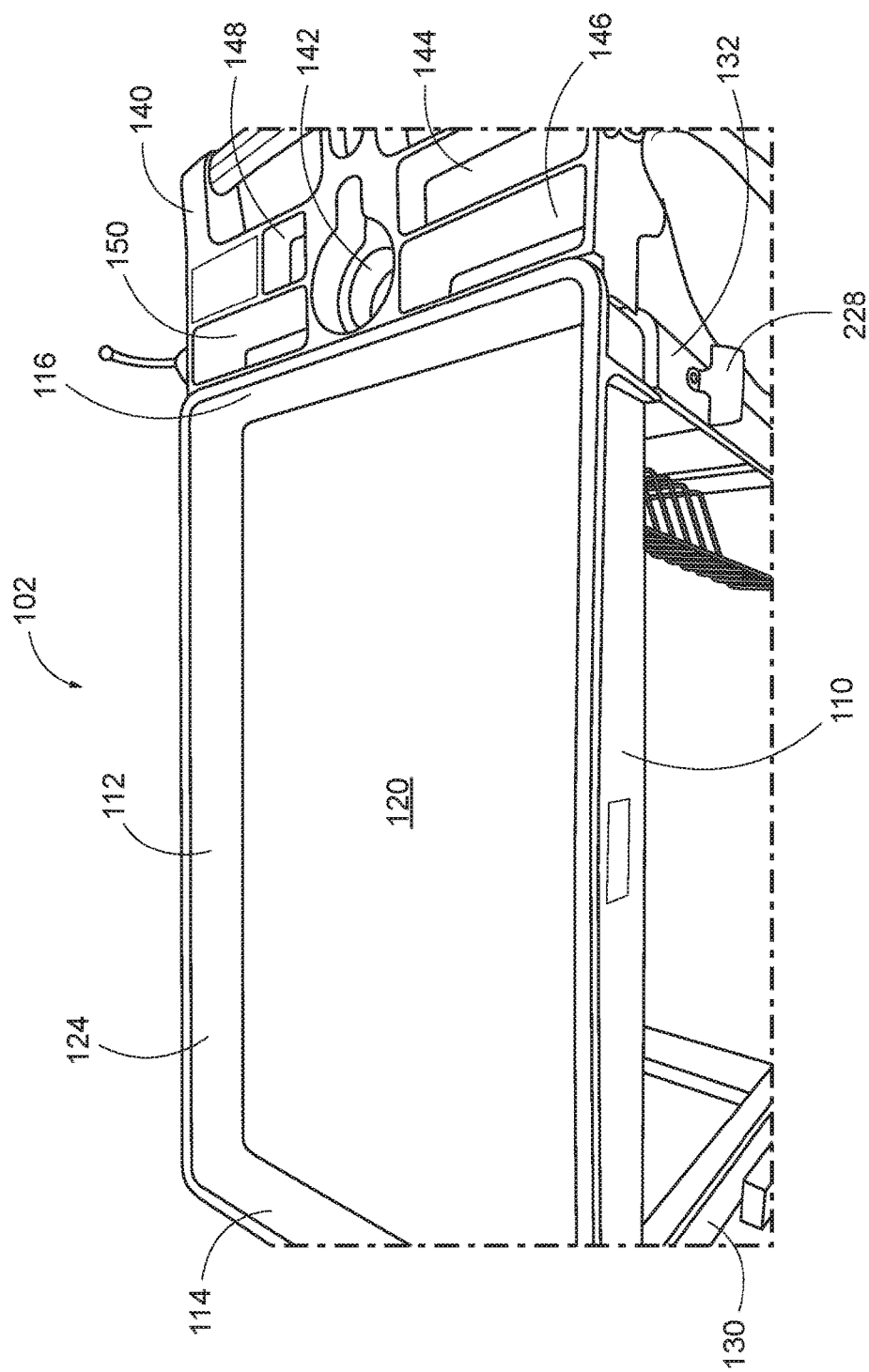
FIG. 2 is a top perspective view of the cart of FIG. 1.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

A modular fishing equipment cart 100 ("cart 100") according to an exemplary embodiment of the present invention is shown in FIGS. 1-18. Cart 100 can vary in size. For example, a small version of cart 100 has a frame 102 having a longitudinal dimension of about 40½ inches, a lateral dimension of about 16 inches, and a height of about 33½ inches. Alternatively, a large version of cart 100 has a frame 102 having a longitudinal dimension of about 46½ inches, a lateral dimension of about 24 inches, and a height of about 33½ inches. Exemplary carts 10 can be a Model 73002 cart provided by WEN Products of Elgin, Ill., although those skilled in the art will recognize that cart 100 can be custom sized and built.

Frame 102 is generally parallelepiped in shape and has a first longitudinal side 110 and a second longitudinal side 112 extending parallel to the first longitudinal side 110. A front lateral side 114 connects the first longitudinal side 110 and the second longitudinal side 112. Similarly, a rear lateral side 116 connects the first longitudinal side 110 and the second longitudinal side 112. In an exemplary embodiment, the first longitudinal side 110 can be the left side of the frame 102 when looking from the rear lateral side 116 toward the front lateral side 114, while the second longitudinal side 112 can be the right side when looking from the rear lateral side 116 toward the front lateral side 114.

The frame 102 further includes a top shelf 120 and a bottom shelf 122. For a small version of cart 100, shelves 120, 122 can have dimensions of about 30 inches×16 inches and for a large version of cart 100, shelves 120, 122 can have dimensions of about 36 inches×24 inches. Each of the top shelf 120 and the bottom shelf 122 includes a full rim 124, 126, respectively, circumscribing the perimeter of the respective shelf 120, 122. Rims 124, 126 can each be about three inches high. Shelves 120, 122 support various equipment, such as coolers, bags, buckets, tackle boxes, tool boxes, boots, and any other equipment that may be required. In an exemplary embodiment, the frame 102 can support and transport approximately 500 lbs worth of cargo mounted on and in the frame 102.

Figure 3:
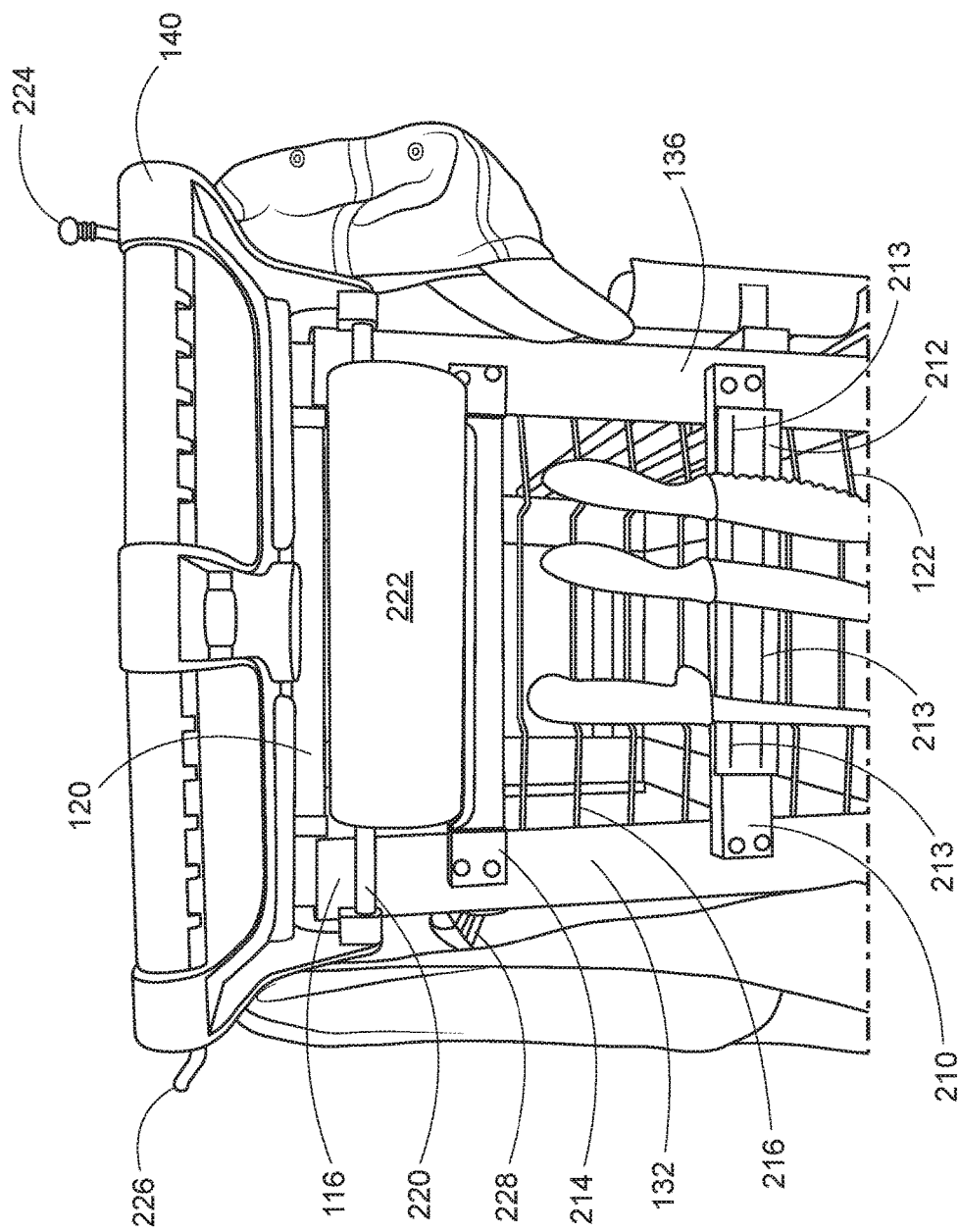
FIG. 3 is a rear elevational view of the cart of FIG. 1.
Figure 4:
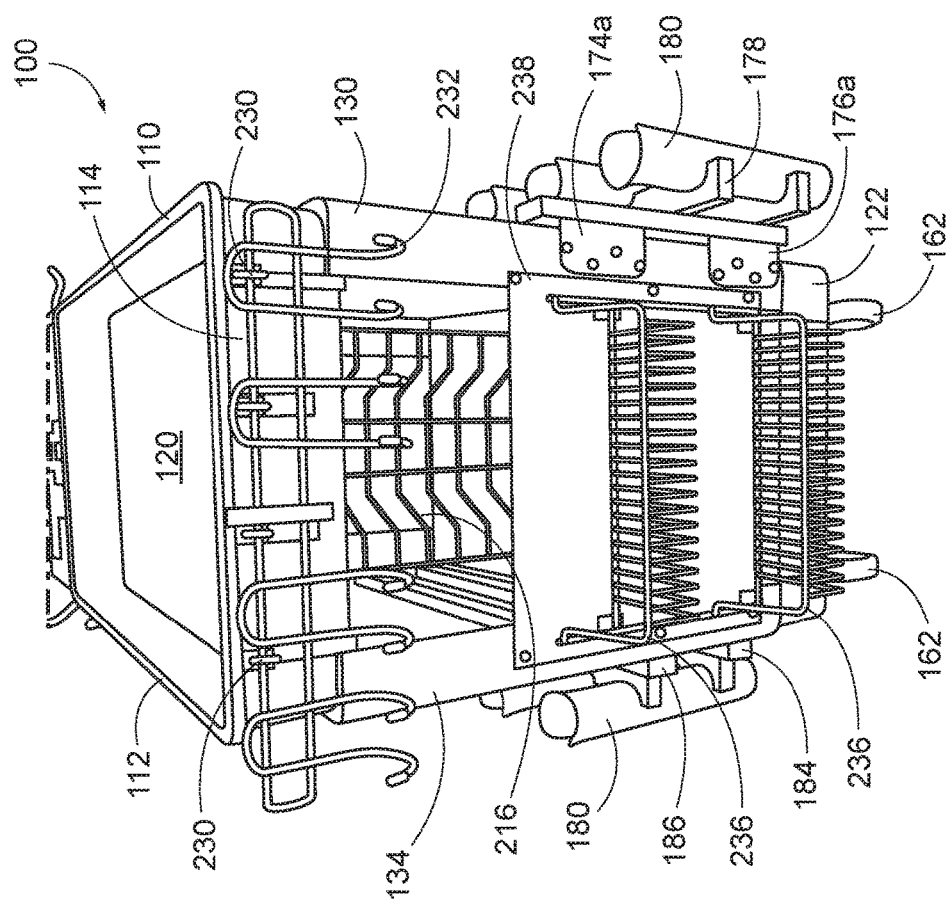
FIG. 4 is a front perspective view of the cart of FIG. 1.
Figure 5:
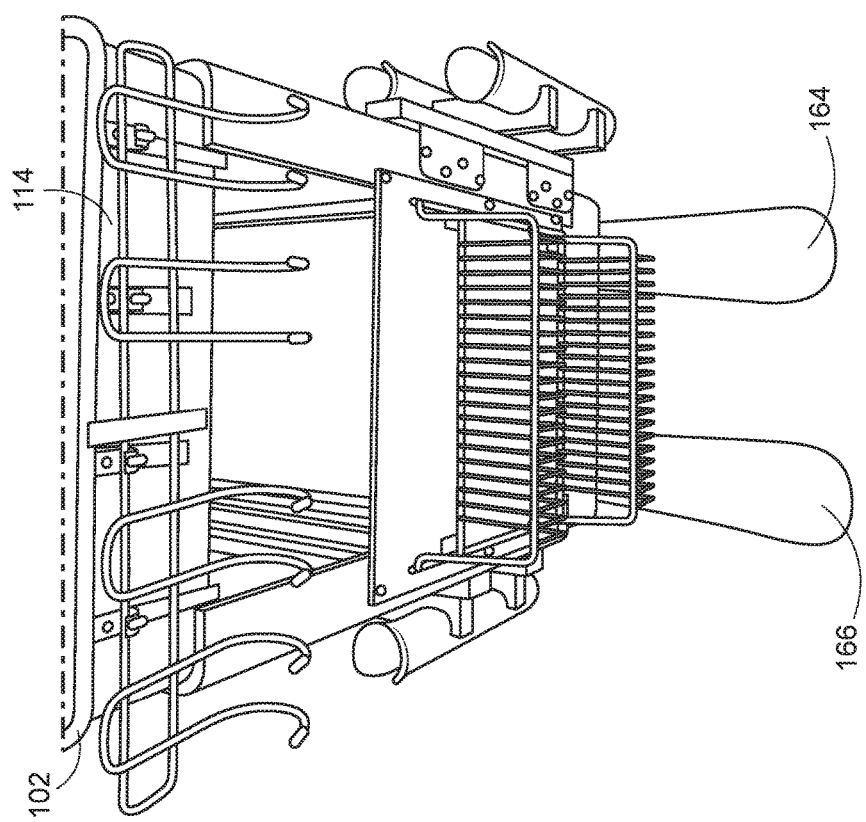
FIG. 5 is a front elevational view of the frame of the cart of FIG. 1 mounted on skis.
Figure 6:
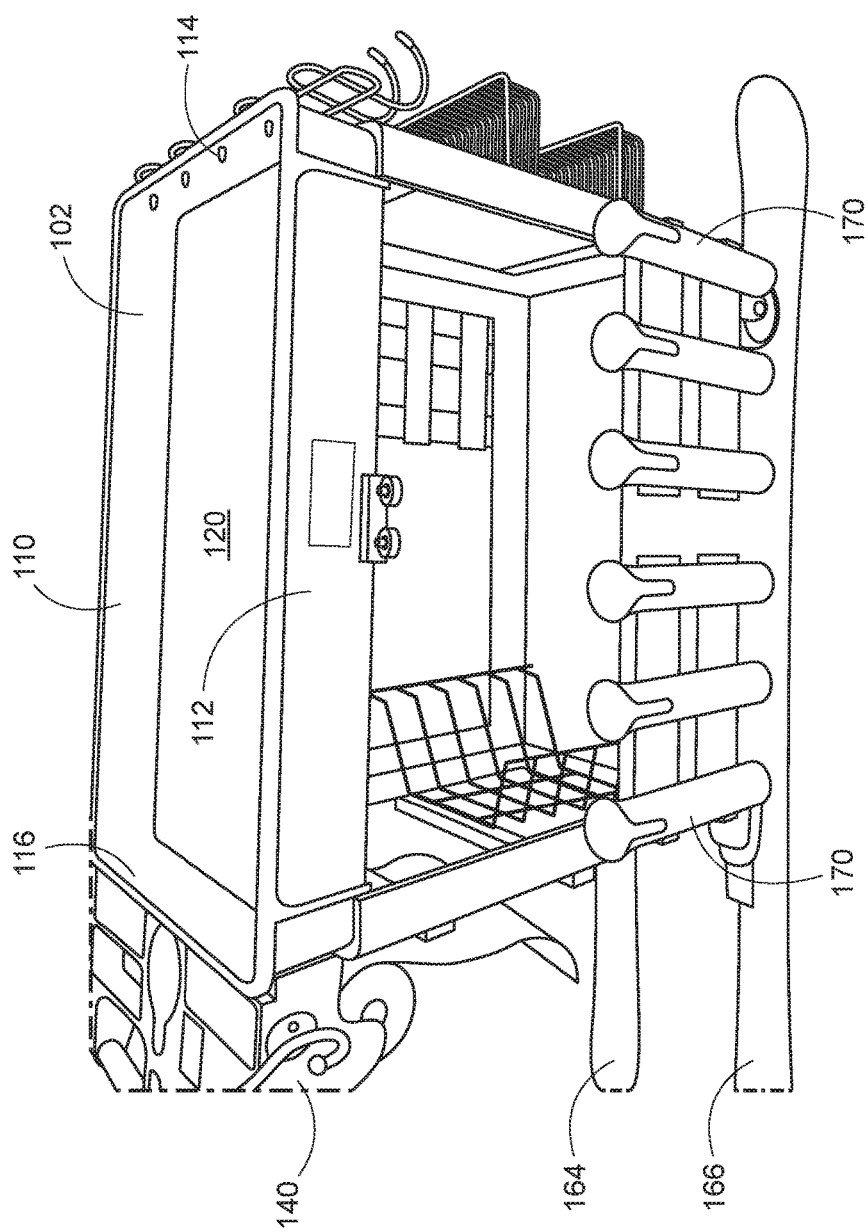
FIG. 6 is side elevational view of the frame with the skis of FIG. 5.

Referring to FIGS. 1, 3, and 4, a plurality of vertical supports 130, 132, 134, 136 extends upwardly from the bottom shelf 122 and support the top shelf 120. Each vertical support 130-136 is located at a corner of the frame 102 generally where two of sides 110, 112, 114, 116 meet.

The frame 102 also includes a handle 140 that extends from the rear lateral side 116. The handle 140 can be fixedly connected to the rear lateral side 116 or removably connected to the rear lateral side 116. The handle 140 can include a molded cup holder 142 and molded receptacles 144, 146, 148, 150 for storing equipment or supporting trays, such as tray 152. In an exemplary embodiment, the tray 152 can be magnetic in order to hold metal objects, such as screwdrivers, pliers, etc. without such objects being readily ejectable from the tray 152 in the event that the cart 100 hits a bump or other rough surface while the cart 100 is being moved. The frame 102 can be constructed from polypropylene or some other suitable polymer or rust proof material and ultraviolet light stabilized material.

A plurality of wheels 162 supports the frame 102 for rolling the frame 102 on the wheels 162. Typically, four wheels 162 are provided, with each wheel 162 located below one of the plurality of supports 130-136.

Optionally, the plurality of wheels 162 is removable from the frame 102 to allow other wheels or other supports to be attached to the frame 102. By way of example only, the wheels 162 have a five inch diameter. Wheels 162 can be replaced by larger wheels, such as wheels having a 12 inch diameter, to allow the cart 100 to be pushed over a sandy beach. Alternatively, skis 164, 166, shown in FIGS. 5 and 6, can be attached to frame 102 so that the cart 100 can be pushed over ice for ice fishing. A first ski 164 is adapted to be connected to the first longitudinal side 110 and a second ski 166 is adapted to be connected to the second longitudinal side 112. Optionally, the skis 164, 166 can be attached to the wheels 162 on their respective sides of the frame 102. Alternatively, the wheels 162 can be removed and the skis 164, 166 can be directly attached to the bottom of the frame 102.

The frame 102 includes a plurality of accessories that are mounted to the frame 102. The accessories can be permanently affixed to the frame 102 or, alternatively, the accessories can be removably attached to the frame 102 to allow the accessories to be removed from the frame 102 and other accessories to be attached to the frame 102.

While some accessories are shown in the Figures as being attached to a particular side, those skilled in the art will recognize that, with the modularity of cart 100, the accessories can be affixed to any side of the cart 100. For example, while some accessories are described herein as being attached to the first longitudinal side 110 or the second longitudinal side 112, those accessories can alternatively be attached to the other longitudinal side or even to the lateral sides 114, 116. Similarly, accessories that are described as being attached to the front and rear lateral sides 114, 116, can also be attached to any of sides 110-116.

Figure 7:
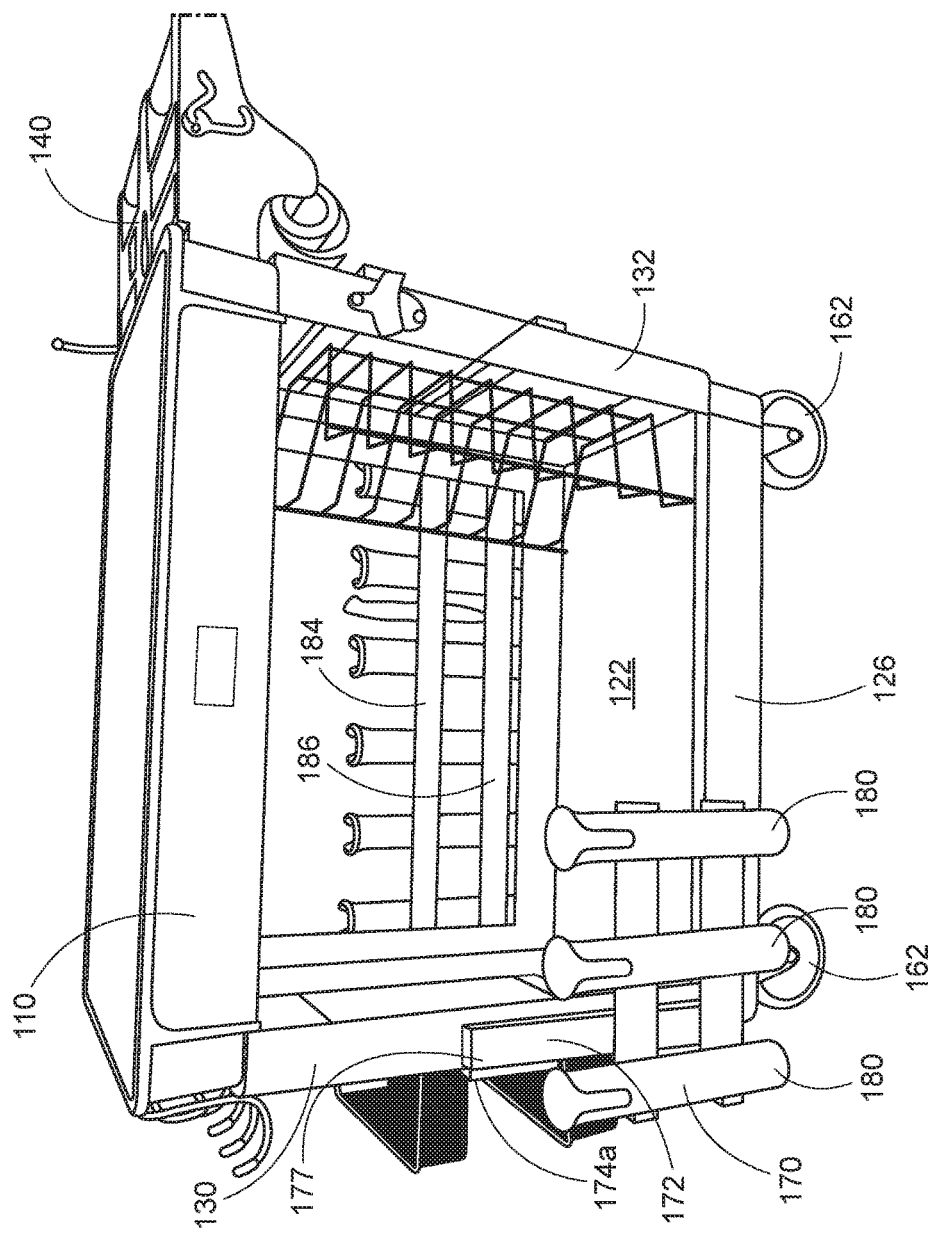
FIG. 7 is a side elevational view of the cart of FIG. 1, with a rod holder assembly in a closed position.
Figure 8:
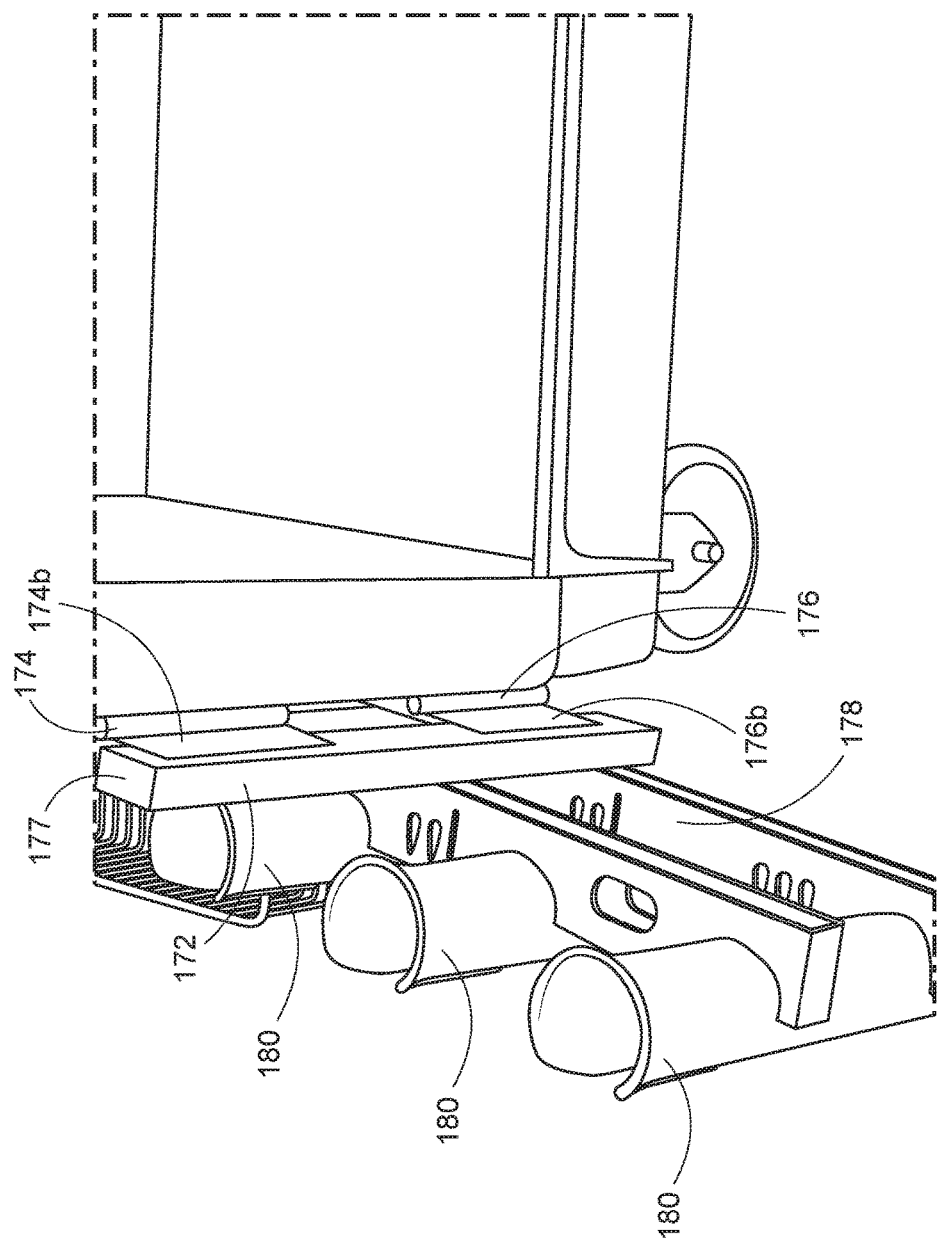
FIG. 8 is a side perspective view of a corner of the cart of FIG. 1, with a rod holder assembly in an open position.
Figure 9:
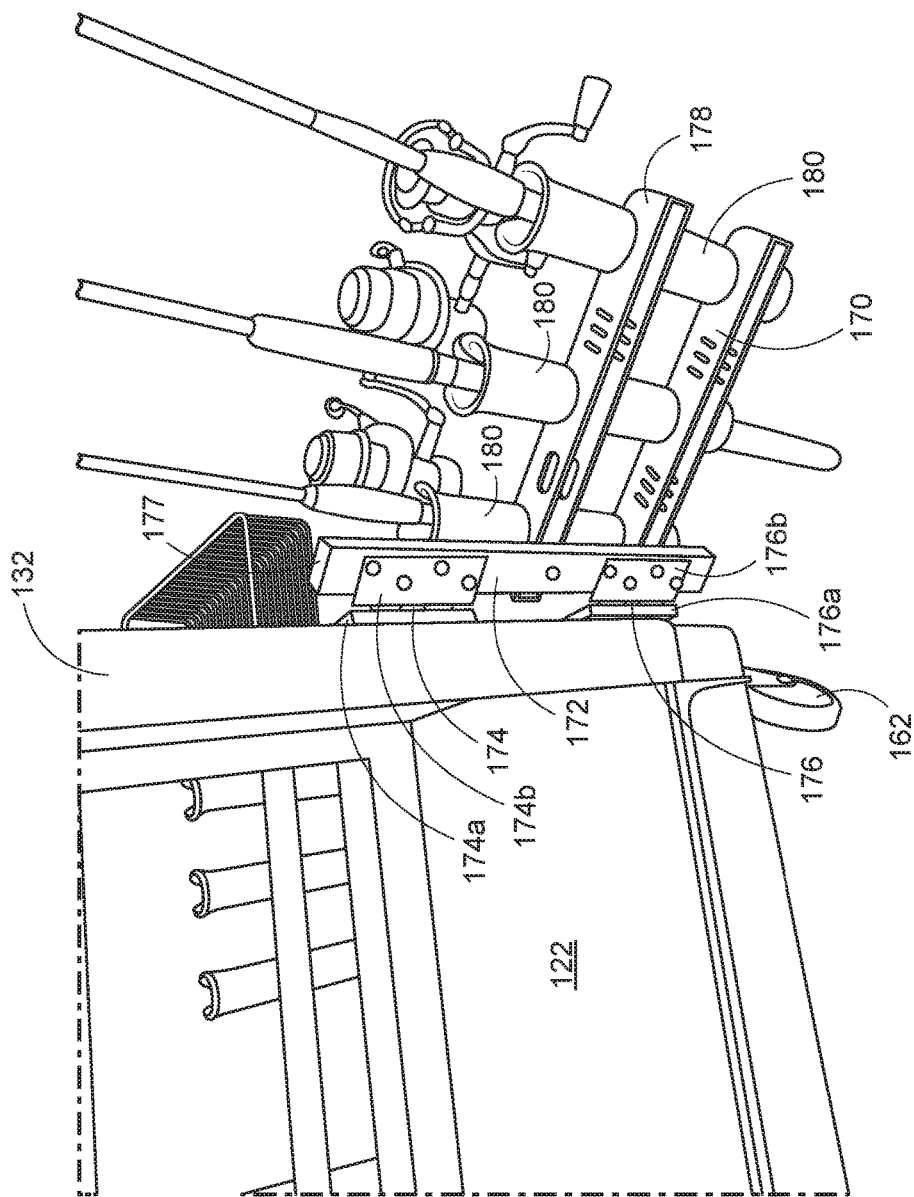
FIG. 9 is a side perspective view of another corner of the cart of FIG. 1, with a rod holder assembly in an open position.

Exemplary accessories can include a rod holder assembly 170, shown in FIGS. 7-9. In an exemplary embodiment, the rod holder assembly extends along the first longitudinal side 110. The rod holder assembly 170 is releasably connected to the first longitudinal side 110. In an exemplary embodiment, the rod holder assembly 170 is releasably attached to one of the plurality of supports 130-136 such that the rod holder assembly 170 is pivotable about the one of the plurality of supports 130-136.

Figure 10:
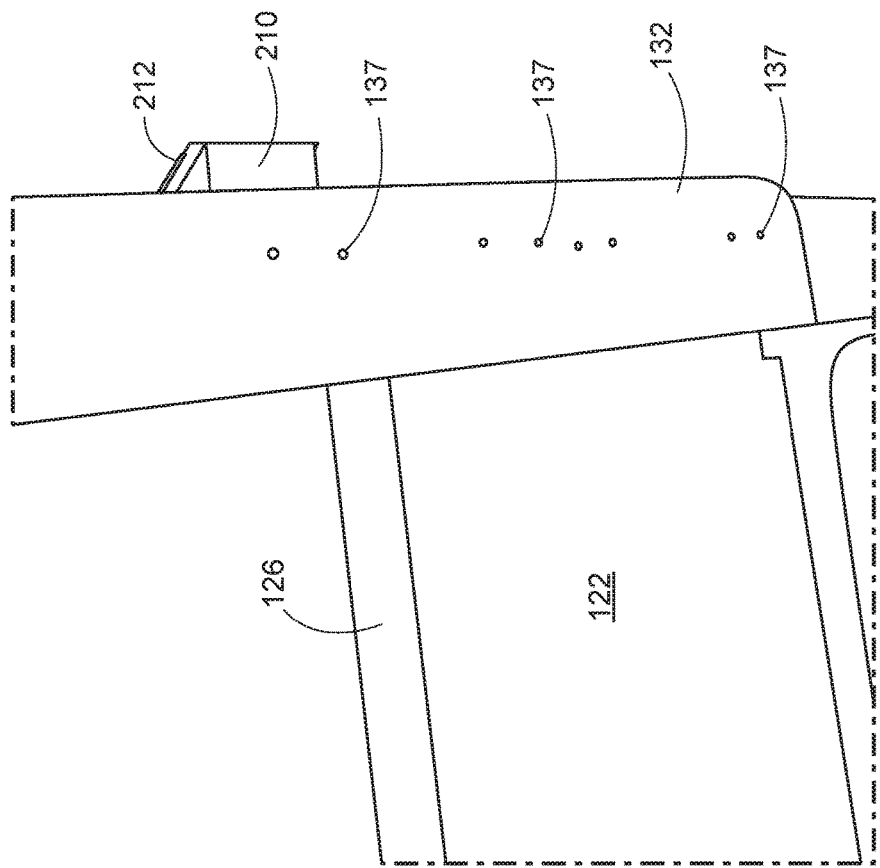
FIG. 10 is an enlarged side view of a support with openings for mounting accessories.
Figure 11:
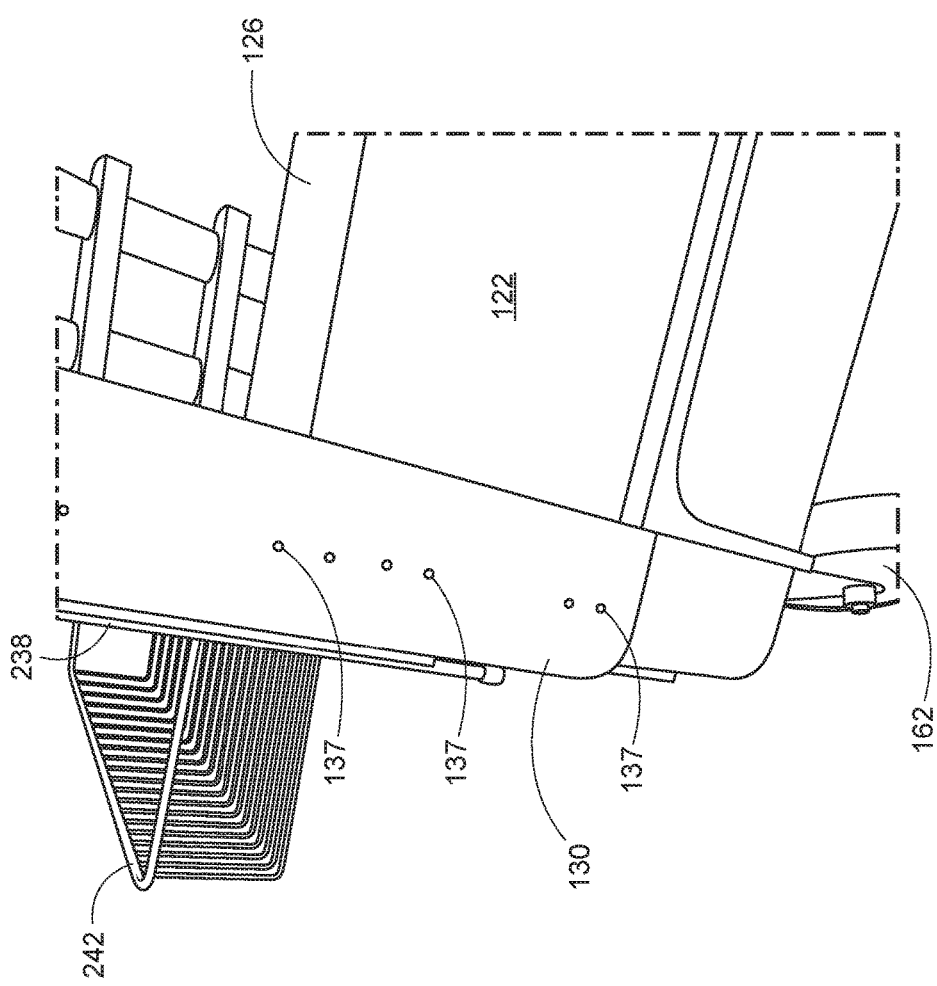
FIG. 11 is an enlarged side view of another support with openings for mounting accessories.

Referring to FIGS. 10 and 11, each of the supports 130-136 includes a plurality of pre-drilled holes 137 (only supports 130, 132 shown with holes 137) so that a pivot mount 172, shown in FIGS. 7-9, can be releasably attached to a selected one of the supports 130-136. The pivot mount 172 includes upper and lower hinges 174, 176, each having a first portion 174a, 176a attached to the support 130-136, and a pivoting portion 174a, 174b, connected to a vertical support 177.

The vertical support 177 is also connected to a rack 178 having at least two rod holders 180, although FIG. 7 shows three rod holders 180. The vertical support 177 can be connected to the rack 178 proximate to any one of the at least two rod holders 180. As shown in FIG. 9, the vertical support 177 is connected to the end of the rack 178, while in FIG. 7, the vertical support 177 is connected to the rack 178 between two of the rod holders 180.

The rod holder assembly 170 is pivotally mounted to the desired support so that the rod holder assembly 170 can pivot against the frame 102 for transport and pivot away from the frame 102, as shown in FIG. 7, to allow access to the bottom shelf 122. Also, a rod holder assembly 170 with three rod holders 180 can be connected to support 130, while another rod holder assembly 176 can be connected to support 132 so that six rod holders 180 can be located on the first side 110 of the frame 102.

Figure 12:
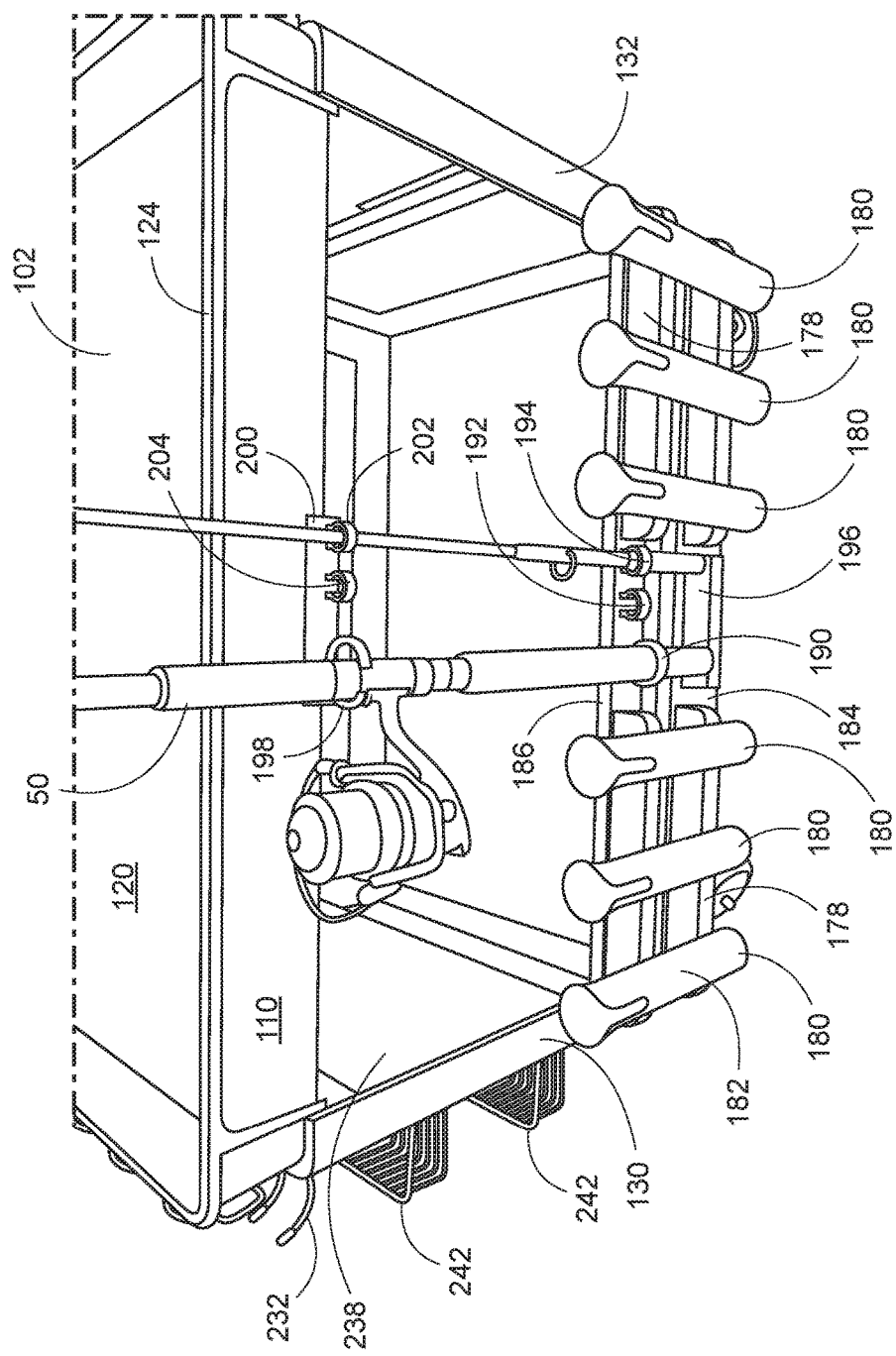
FIG. 12 is a side perspective view of the cart of FIG. 1 with a rod holder assembly extending there-across.

Alternatively, a rod holder assembly 182 can be releasably mounted to the frame 102 such that the rod holder assembly does not pivot. As shown in FIG. 12, the rod holder assembly 182 includes a pair of horizontal bars 184, 186 that each extends between and is releasably mounted to supports 130, 132. A first rack 178 with a plurality of rod holders 180 is located proximate to the front lateral side 114 at support 134 and a second rack 178 with a plurality of rod holders 180 is located proximate to the rear lateral side 116 at support 136. With this arrangement, the two racks 178 can hold six rods. Sufficient space is provided between the racks 178 such that another rod, such as a large surf rod 50, can be broken down and releasably secured to the bars 184, 186.

To support the surf rod 50, a plurality of lower rod clamps 190, 192, 194 are attached to the upper bar 186 between the first plurality of rod holders 180 in the first rack 178 and the second plurality of rod holders 180 in the second rack 178. Additionally, a support bracket 196 is mounted on the lower bar 184 below the plurality of lower rod clamps 190-194. The clamps 190-194 secure the pieces of the rod 50, while the support bracket 196 vertically supports the pieces of the rod 50. Additionally, a plurality of upper rod clamps 198, 200, 202 are attached to a bracket 204, which is in turn, releasably secured to the top shelf 120 such that the upper rod clamps 198-202 are directly over the lower rod clamps 190-194 to further secure the pieces of the rod 50.

Figure 13:
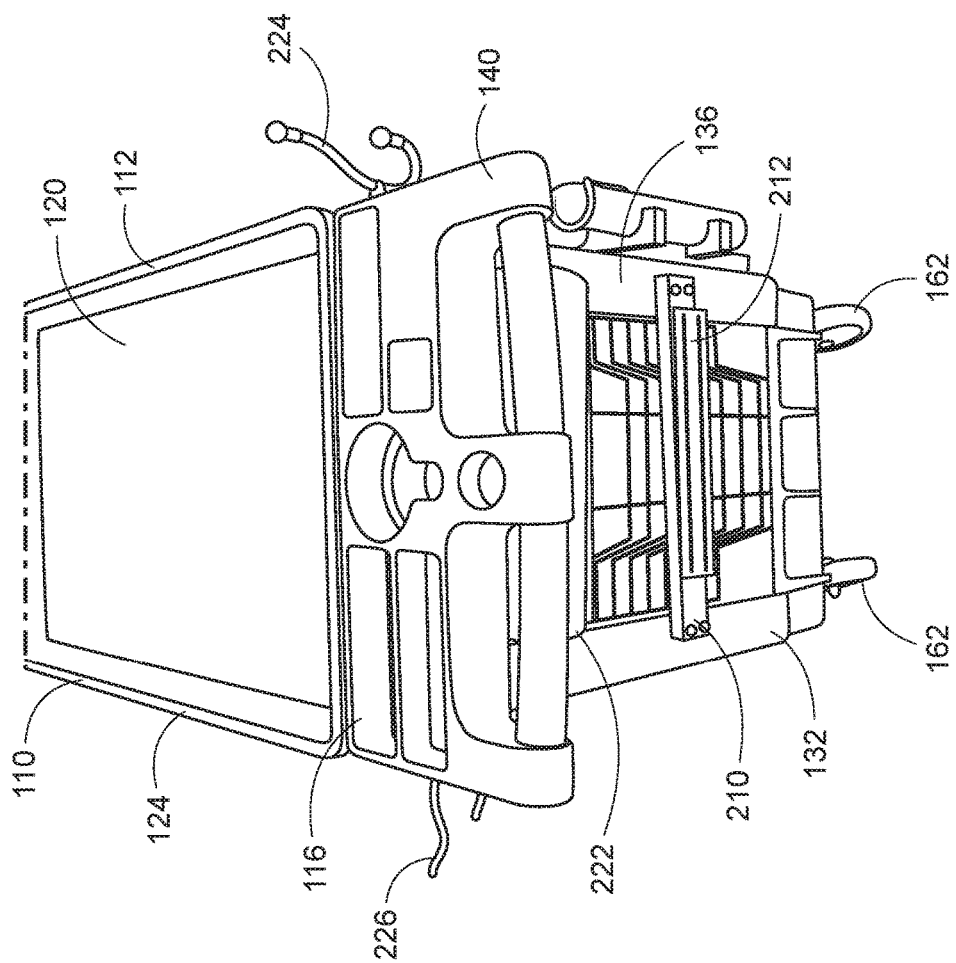
FIG. 13 is a rear perspective view of the cart of FIG. 1.

Referring now to FIGS. 3 and 13 and the rear lateral side 116, a magnetic holder 210 is releasably attached to the rear lateral side 116 between the supports 132, 136. The holder 210 includes a magnetic strip 212 that magnetically attracts metal tools, such as knives, pliers, screwdrivers, and other tools that can be of use to the user. Holder 210 can include vertical holes formed therein that are sized to allow one of more screws 272 (shown in FIG. 24) to extend therethrough. The screws 272 can attach to an auxiliary shelf assembly 260, shown in FIGS. 22-25, as will be discussed in more detail below.

Additionally, a rack holder 214 can be releasably attached to the rear lateral side 116 between the supports 132, 136. As can be seen in FIG. 3, the rack holder 214 is located vertically above the magnetic holder 210. The rack holder 214 includes a plurality of hooks to vertically support a rack 216 that is installed inside the frame 102 between the top shelf 120 and the bottom shelf 122. The rack 216 can be used to support a plurality of compartmentalized containers 218, such as is shown in FIG. 1.

Additionally, as shown in FIG. 3, a towel rod 220 extends under the handle 140. The towel rod 220 is removable from the handle 140 so that a roll of paper towels 222 can be placed on the towel rod 220. Further, garment hooks 224, 226 can be attached to the handle 140. The garment hooks 224, 226 can be multi-hooks and can be used to support articles of clothing such as hats, caps, jackets and other clothing, as well as towels or other articles. Also, as shown in FIG. 3, a bottle opener 228 can be mounted to the frame 102.

Figure 14:
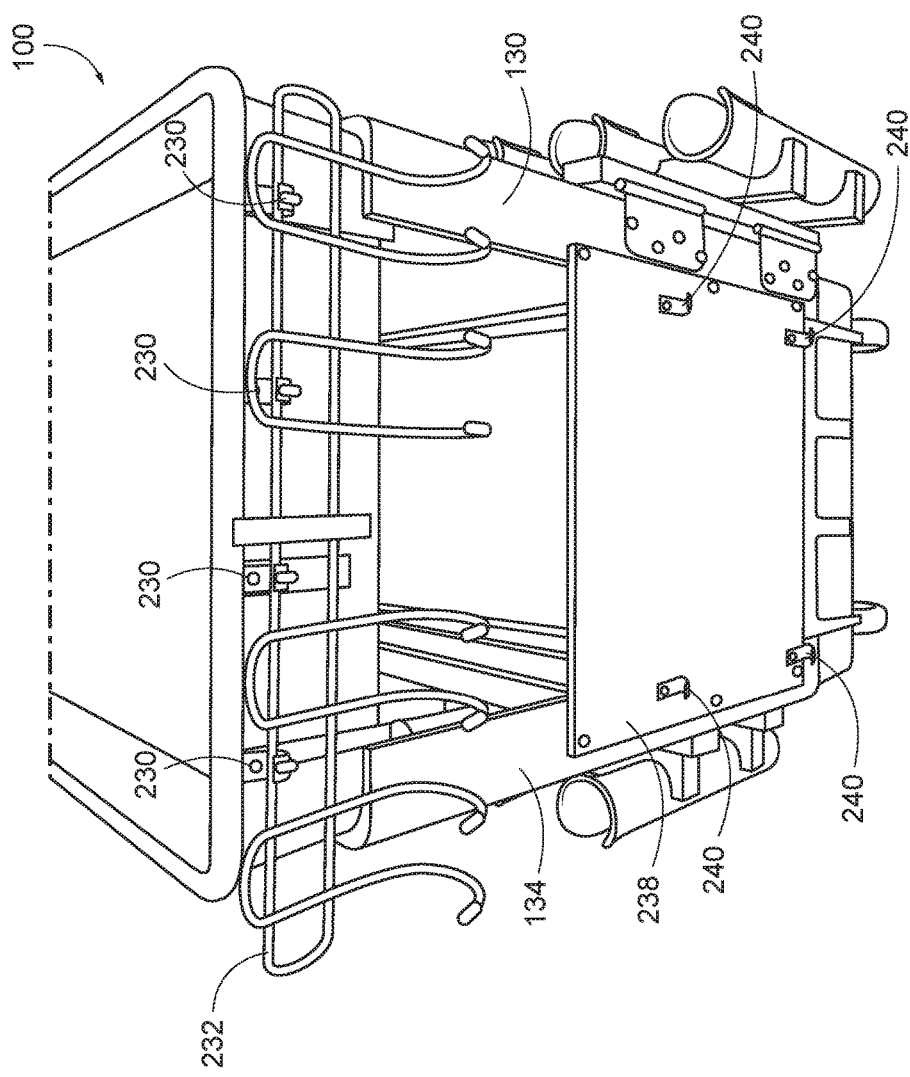
FIG. 14 is a front perspective view of the cart of FIG. 1.
Figure 15:
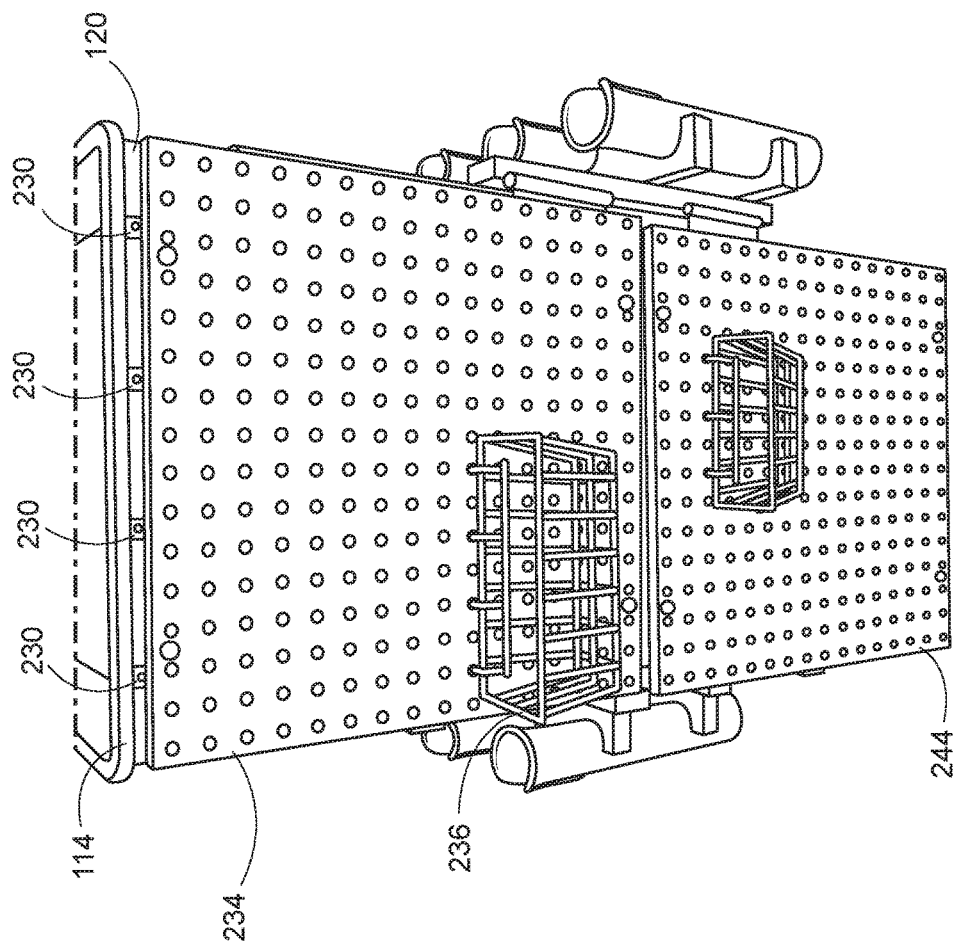
FIG. 15 is a front perspective view of an alternative configuration of the cart of FIG. 1.

Referring now to FIG. 14, a plurality of hooks 230 are co-linearly attached to the front lateral side 114 along the top shelf 120. The hooks 230 can be mounted on the rack 216 that is removably attached to the inside of the frame 102 as discussed above. The hooks 1230 allow for modularity in accessories that can be mounted to the front lateral side 114. By way of example only, a hook rack 232 can be releasably attached to the hooks 230. Alternatively, as shown in FIG. 15, a peg board 234 can be releasably attached to the hooks 230. The pegboard 234 allows for the connection of other accessories such as, for example, a wire basket 236, thereto. Alternatively, the rack 216 can be attached to either the hooks 230 or to the peg board 234.

Figure 16:
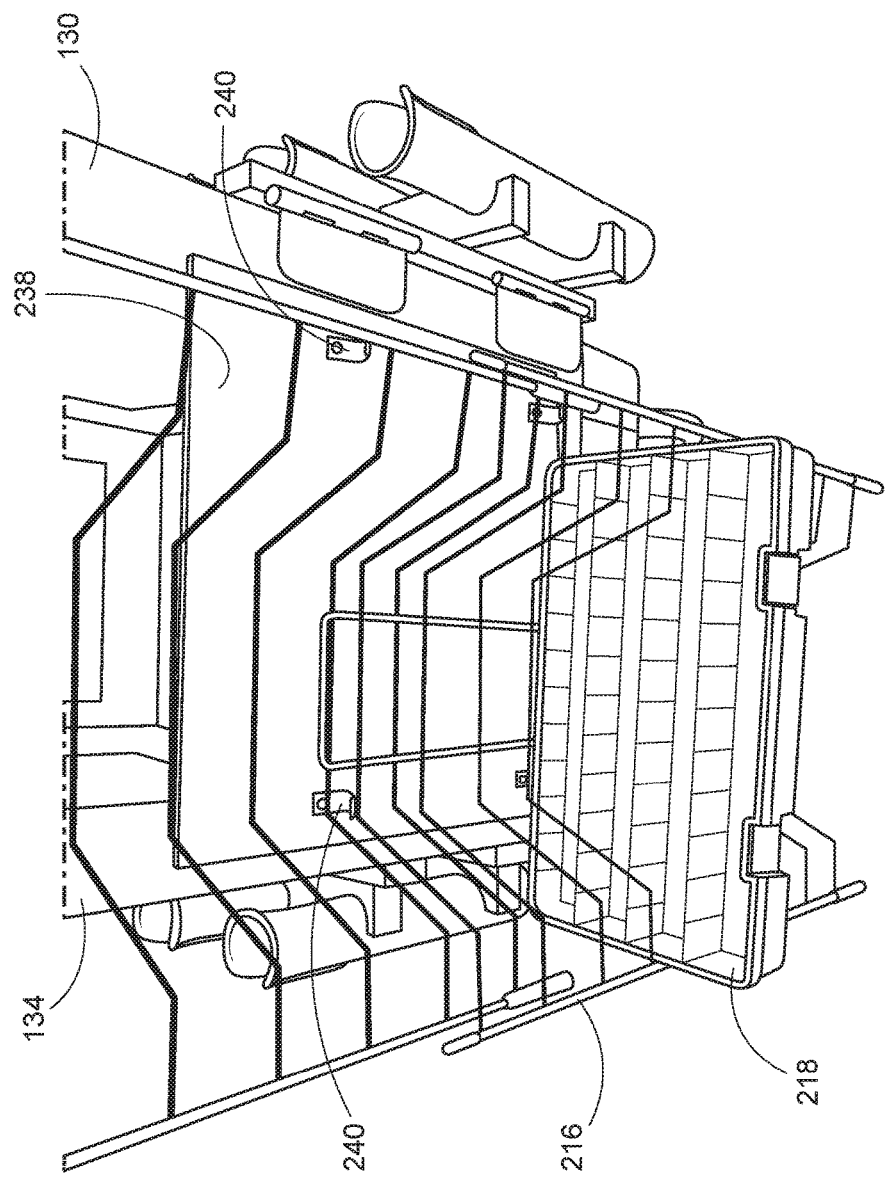
FIG. 16 is a front perspective view of another alternative configuration of the cart of FIG. 1.

Additionally, a board 238 can be releasably attached to the supports 130, 134. The board 238 can include hooks 240 to support other accessories, such as, for example, wire baskets 242, as shown in FIG. 4 or the rack 216, as shown in FIG. 16. Alternatively, as shown in FIG. 15, a second peg board 244 can be attached to the supports 130, 134.

Figure 17:
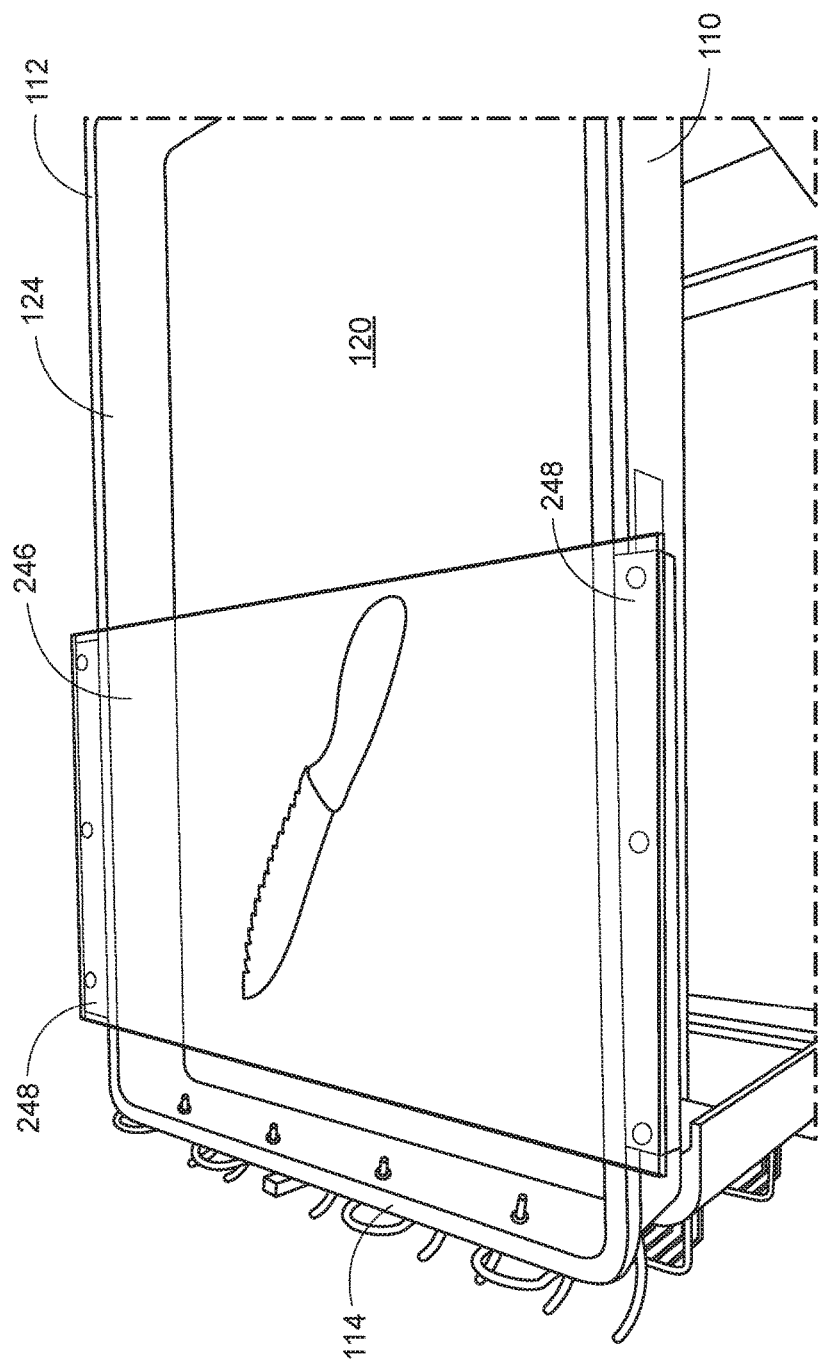
FIG. 17 is a top perspective view of the cart of FIG. 1, with a cutting board placed thereon.

Referring to FIG. 17, a cutting board 246 can be removably mountable on the top shelf 120. The cutting board 246 is sized to extend over the rim 124 of the top shelf 120 to vertically support the cutting board 246. The cutting board 246 can include a plurality of longitudinal ribs 248 on the under side of the board 246 to prevent the cutting board 246 from inadvertently sliding off the rim 124 during use. The cutting board 246 can be food grade butcher block material, Lexan®, plastic, or other suitable material. The cutting board 246 can also be drilled to mount accessories, such as, for example, a fly tying vice (not shown).

Figure 18:
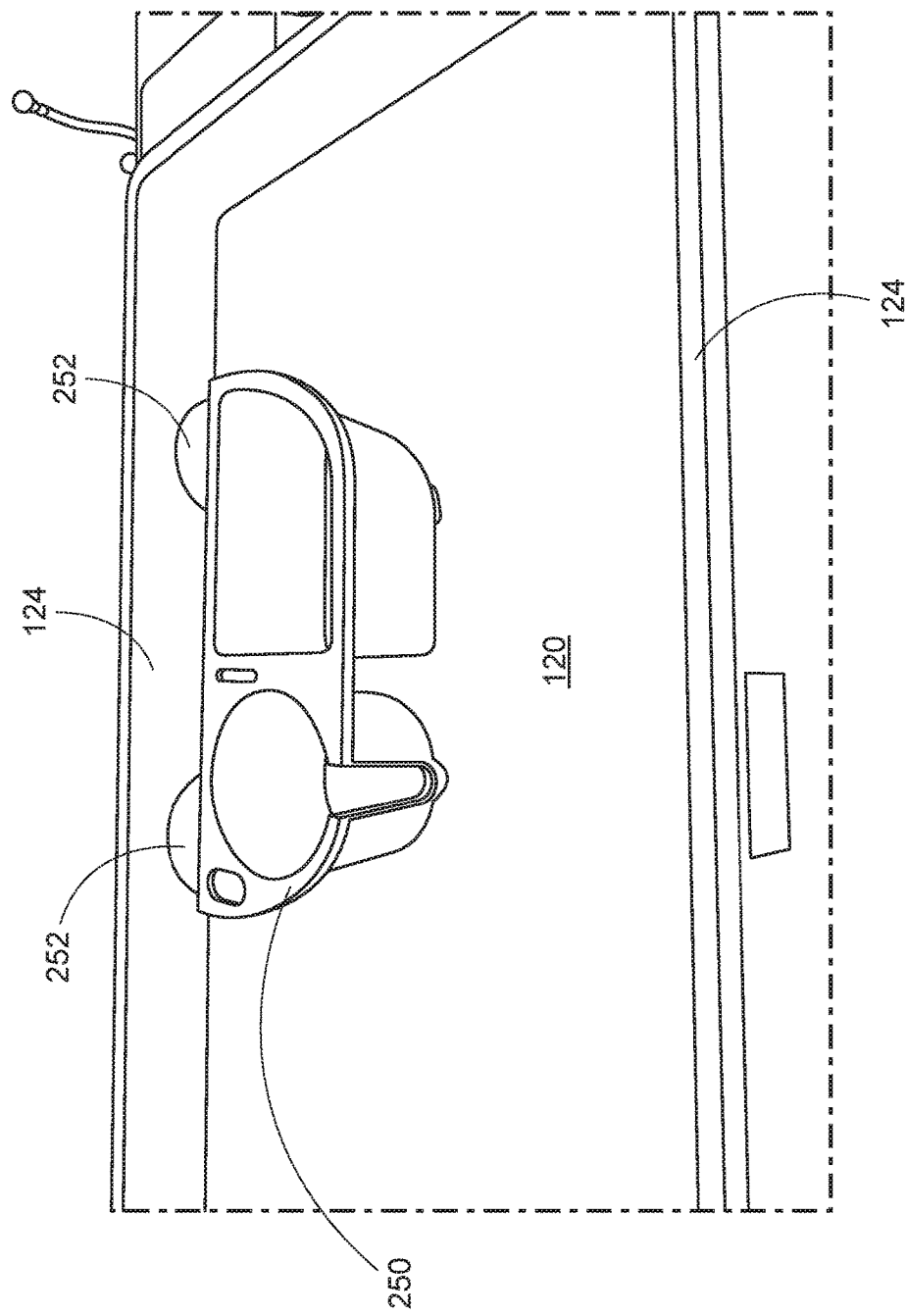
FIG. 18 is a top perspective view showing a releasably attachable sink attached to the top shelf of the cart of FIG. 1.

Referring now to FIG. 18, a removable sink 250 can be releasably attached to rim 124 around the top shelf 120. Sink 250 includes a plurality of suction cups 252 that can be attached to the interior of rim 124 so that sink 250 extends over top shelf 120. Alternatively, the suction cups 252 can be attached to the exterior of rim 124 so that sink 250 does not extend over top shelf 120, allowing any water or other fluid poured into sink 250 can pour out through drain holes in the bottom of sink 250 and away from shelf 120.

Figure 19:
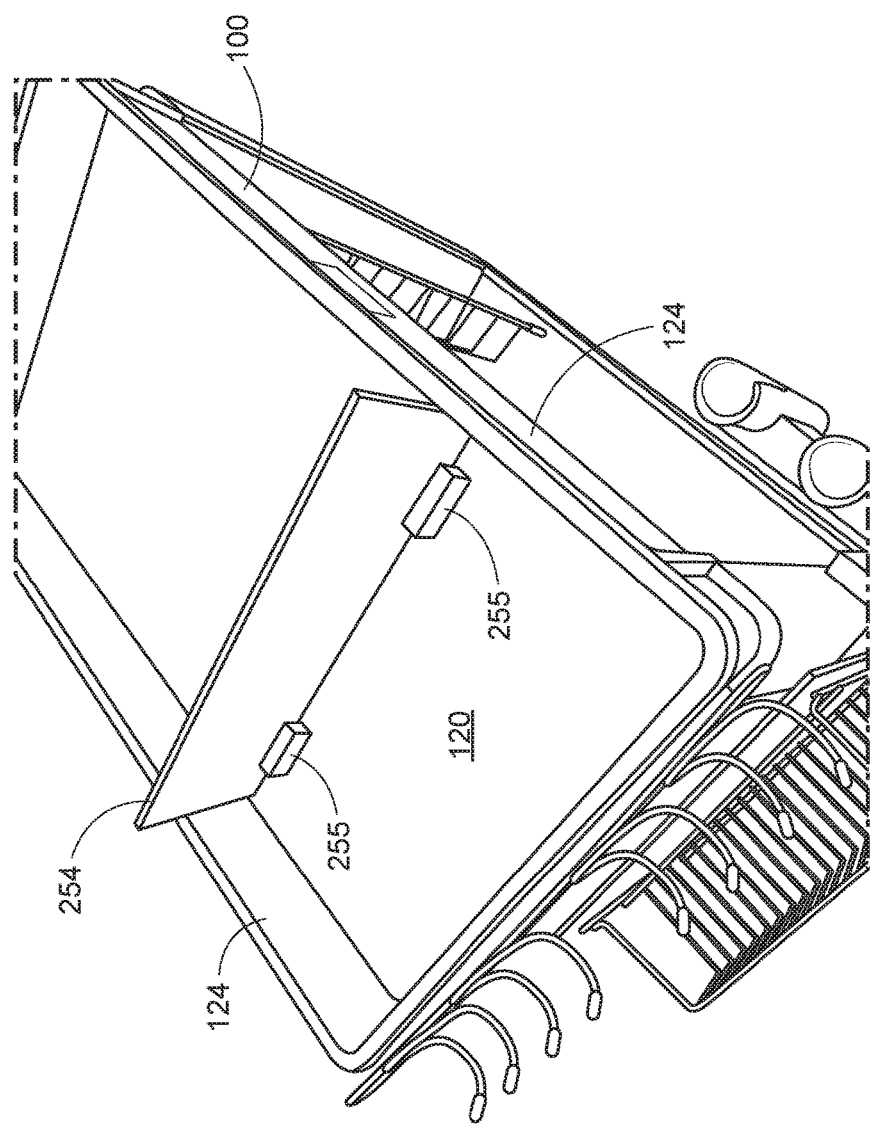
FIG. 19 is a perspective view showing a first divider placed on the top shelf of the cart of FIG. 1.
Figure 20:
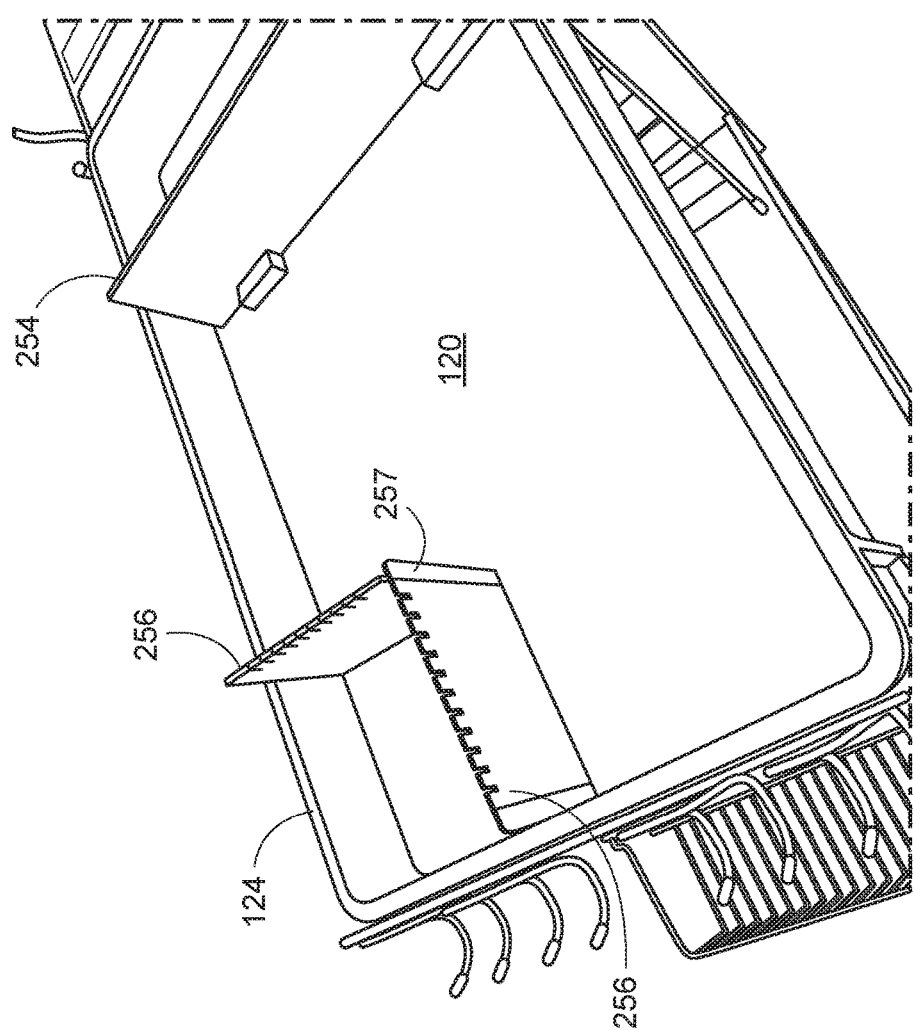
FIG. 20 is a perspective view showing a second divider placed on the top shelf of the cart of FIG. 1.
Figure 21:
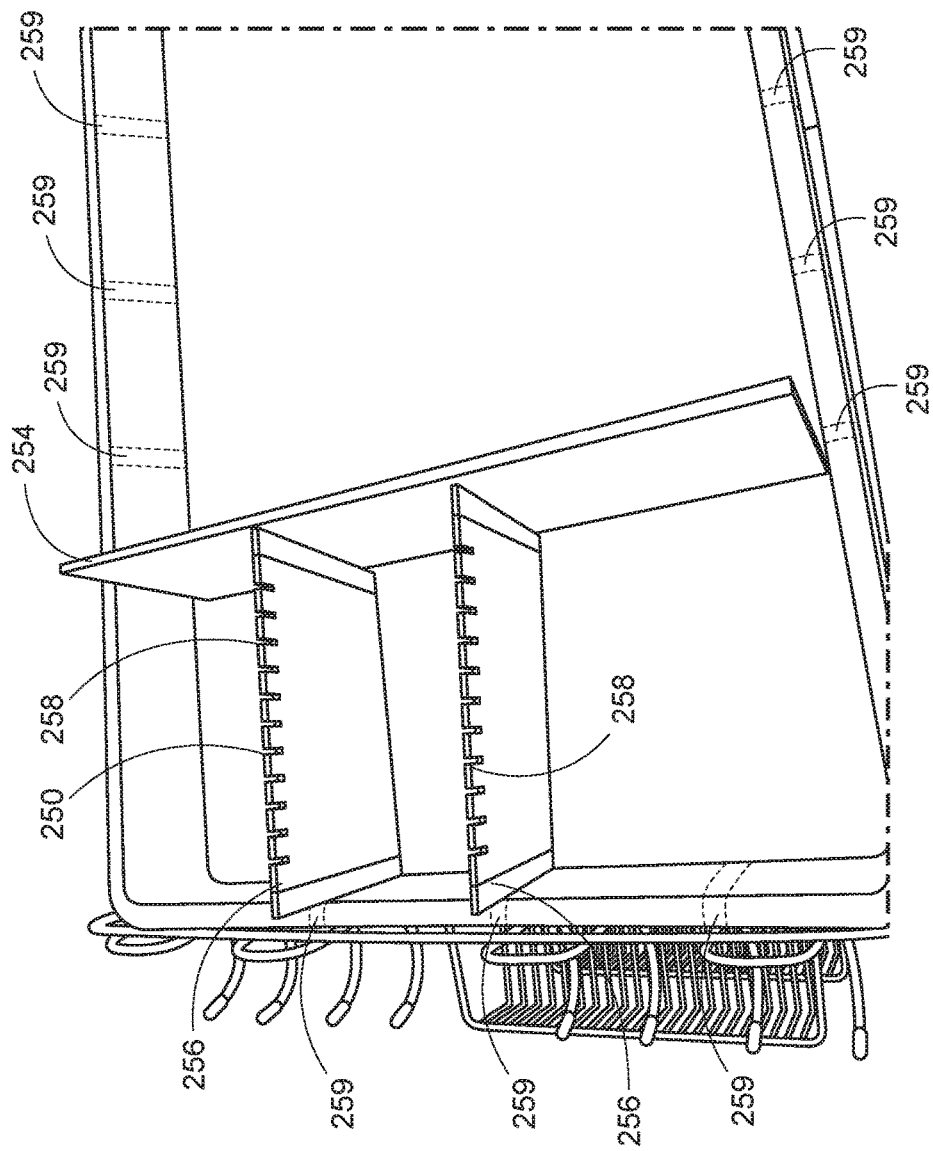
FIG. 21 is a perspective view showing the first and second dividers of FIGS. 19 and 20 placed on the top shelf of the cart of FIG. 1.

FIGS. 19-21 show a plurality of dividers 254, 256 that can be placed on top shelf 120 to form open top compartments. As shown in FIG. 19, dividers 254 can be used separately; as shown in FIG. 20, dividers 256 can be used with each other; and as shown in FIG. 21, dividers 254, 256 Dividers 256 can be used together.

As shown in FIG. 19, divider 3254 can include a plurality of feet 255 to allow divider 254 to stand vertically. As shown in FIG. 20, a connecting clip 257 can be attached to either end of dividers 256 to allow dividers 256 to be placed a right angles to each other. As shown in FIG. 21, dividers 256 include vertical slots 258 to support spinnerbaits (not shown) when the dividers 256 are placed in parallel with each other. Optionally, as shown in FIG. 21, rim 124 can include a plurality of slots 259 formed all around to allow dividers 254, 258 to be inserted therein.

As shown in FIGS. 22-25, auxiliary shelf assembly 260 is shown. Shelf assembly 260 is releasably attachable to cart 100 via the magnetic holder 210. Shelf assembly 260 includes a plurality of legs 262 that support a shelf 264. Legs can be hollow with an opening in the top end thereof to accept a fishing rod 52 or other tool (See FIG. 23).

Figure 22:
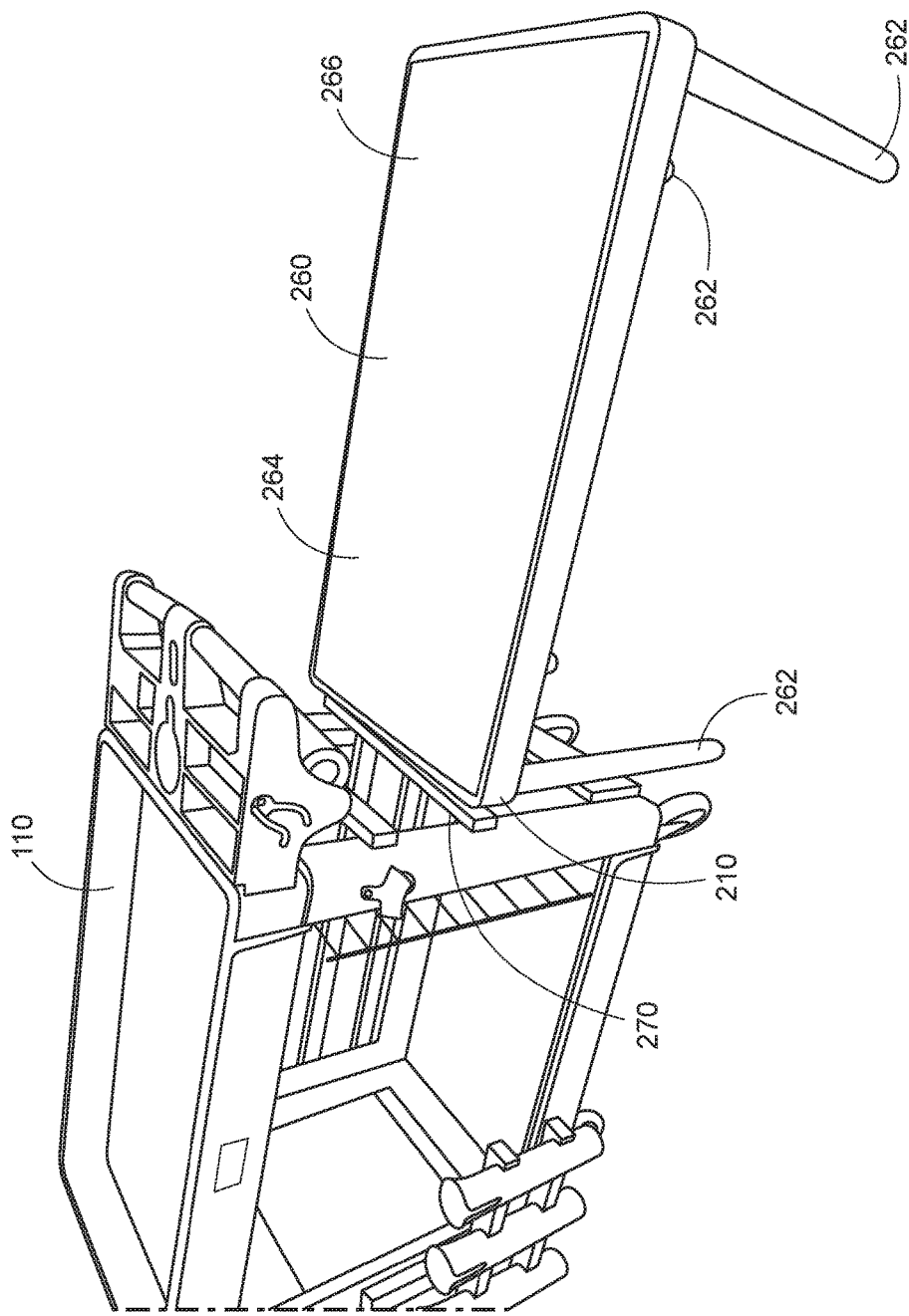
FIG. 22 is a perspective view of a shelf assembly attached to the cart of FIG. 1.
Figure 23:
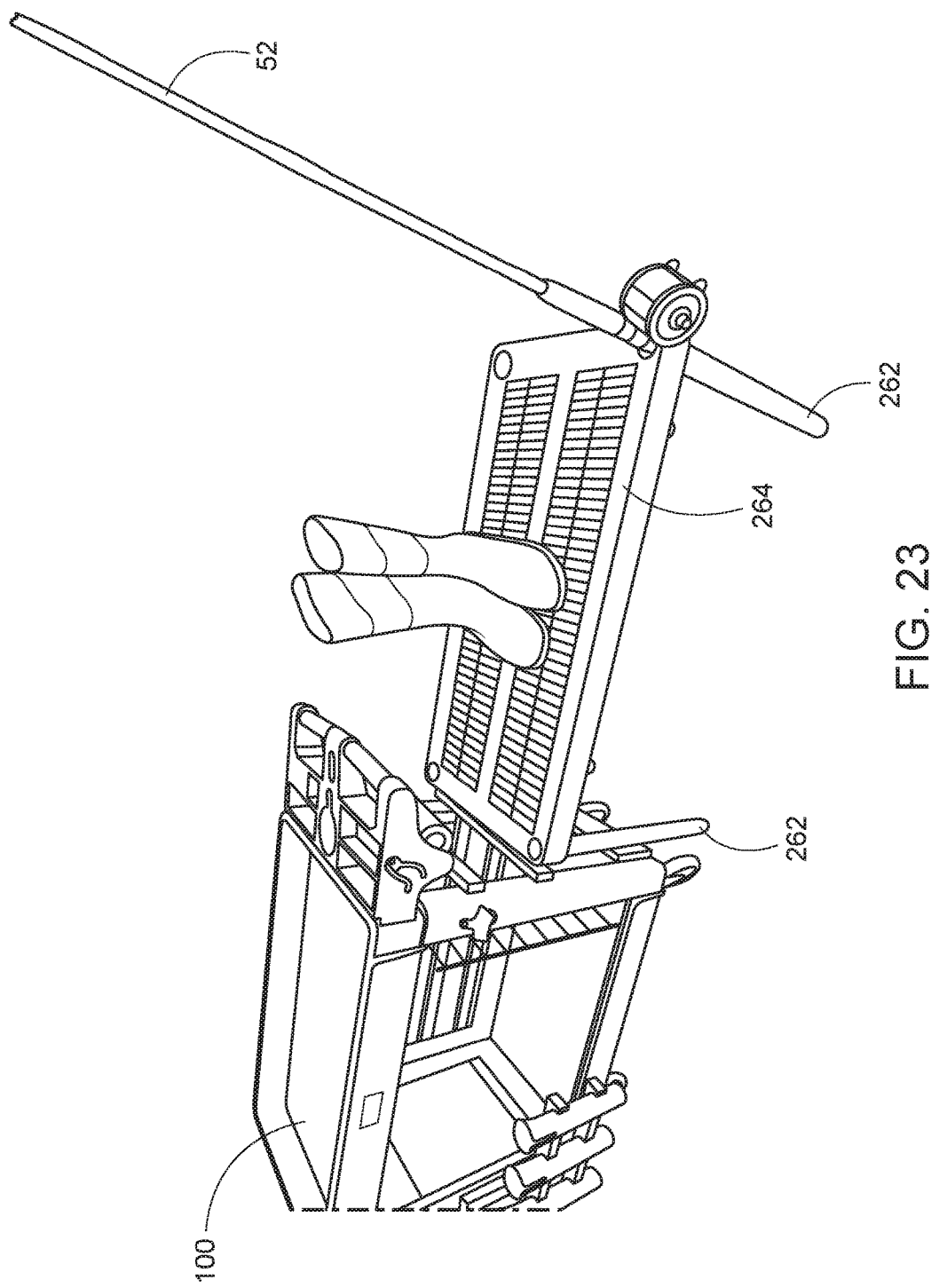
FIG. 23 is a perspective view of an alternative embodiment of a shelf assembly attached to the cart of FIG. 1.
Figure 24:
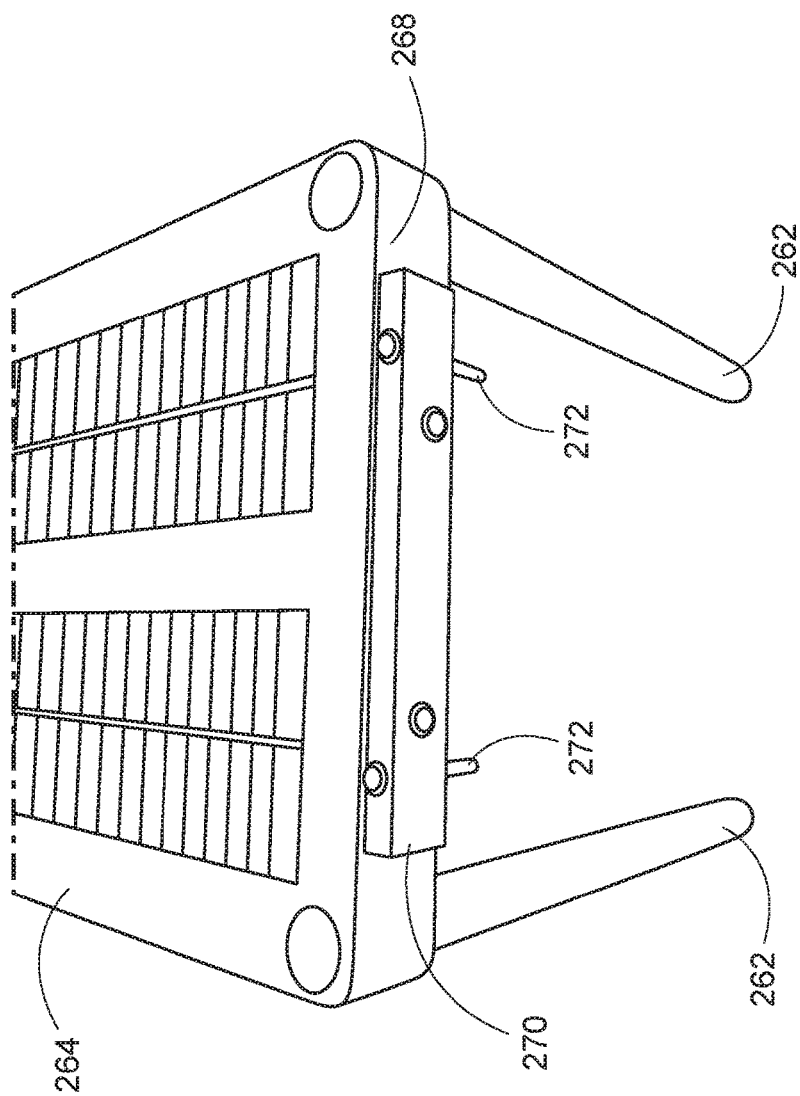
FIG. 24 is a perspective view of a lateral end of the shelf assembly of FIG. 23.
Figure 25:
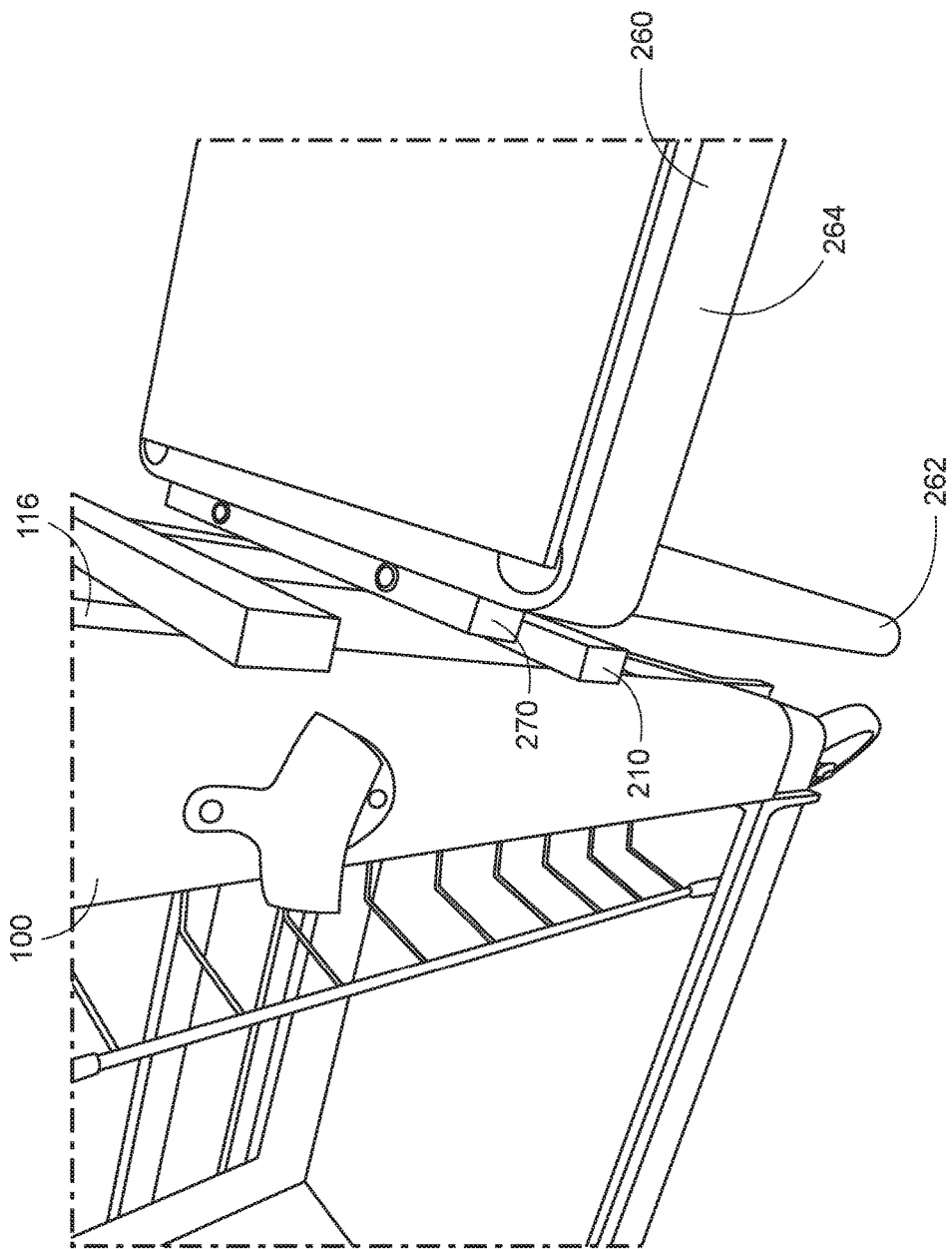
FIG. 25 is a close-up view of the shelf assembly of FIG. 22 attached to the cart of FIG. 1.

Optionally, as shown in FIG. 22, a platform 266 can cover shelf 264 or alternatively, as shown in FIG. 23, cover 266 can be omitted. FIG. 24 shows a lateral end 268 of shelf assembly 260, with a brace 270 affixed thereto. Brace 270 is located such that, when the shelf assembly 260 is placed against the rear lateral side 116 of the cart 100, the brace 270 is located just above magnetic holder 210.

Screws 272 extend downwardly through brace 270 and are long enough to also extend through magnetic holder 210 so that brace 270 can be placed in top of magnetic holder 212 and screws 272 can be inserted through the holes in magnetic holder 210.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A modular fishing equipment cart comprising: a frame having: a first longitudinal side; a second longitudinal side extending parallel to the first longitudinal side; a front lateral side connecting the first longitudinal side and the second longitudinal side; and a rear lateral side connecting the first longitudinal side and the second longitudinal side; a plurality of wheels supporting the frame for rolling the frame on the wheels; a rod holder assembly extending along the first longitudinal side; a plurality of hooks co-linearly attached to the front lateral side; and a magnetic holder releasably attached to the rear lateral side.

2. The modular fishing equipment cart according to claim 1, wherein the frame further comprises:
a top shelf;
a bottom shelf; and
a plurality of supports extending upwardly from the bottom shelf and supporting the top shelf.

3. The modular fishing equipment cart according to claim 2, wherein the rod holder assembly is releasably attached to one of the plurality of supports.

4. The modular fishing equipment cart according to claim 3, wherein the rod holder assembly is pivotable about the one of the plurality of supports.

5. The modular fishing equipment cart according to claim 4, wherein the rod holder assembly comprises at least two rod holders, and wherein the rod holder assembly is connectable to the one of the plurality of supports proximate to any one of the at least two rod holders.

6. The modular fishing equipment cart according to claim 2, wherein each of the plurality of wheels is below one of the plurality of supports.

7. The modular fishing equipment cart according to claim 2, wherein the rod holder assembly comprises a first plurality of rod holders located proximate to the front lateral side and a second plurality of rod holders located proximate to the rear lateral side.

8. The modular fishing equipment cart according to claim 7, further comprising:
a plurality of lower rod clamps located between the first plurality of rod holders and the second plurality of rod holders; and
a support bracket located below the plurality of lower rod clamps.

9. The modular fishing equipment cart according to claim 8, further comprising a plurality of upper rod clamps mounted to the top shelf directly over the lower rod clamps.

10. The modular fishing equipment cart according to claim 2, further comprising a cutting board removably mountable on the top shelf.

11. The modular fishing equipment cart according to claim 2, further comprising a rack releasably attached to the rear lateral side, the rack being adapted to support a plurality of compartments located between the top shelf and the bottom shelf.

12. The modular fishing equipment cart according to claim 2, further comprising a plurality of dividers adapted to be removably placed on the shelf.

13. The modular fishing equipment cart according to claim 1, wherein the plurality of wheels are removable from the frame.

14. The modular fishing equipment cart according to claim 1, wherein the rod holder assembly is releasably connected to the first longitudinal side.

15. The modular fishing equipment cart according to claim 1, further comprising a rack releasably connectable to the plurality of hooks.

16. The modular fishing equipment cart according to claim 1, further comprising a board releasably connectable to the plurality of hooks.

17. The modular fishing equipment cart according to claim 1, wherein the plurality of wheel are removable from the frame.

18. The modular fishing equipment cart according to claim 17, further comprising a first ski adapted to be connected to the first longitudinal side and a second ski adapted to be connected to the second longitudinal side.

19. The modular fishing equipment cart according to claim 1, further comprising a handle extending along the rear lateral side.

20. The modular fishing equipment cart according to claim 19, further comprising a towel rod extending under the handle.

21. The modular fishing equipment cart according to claim 19, further comprising a garment hook attached to the frame.

22. The modular fishing equipment cart according to claim 19, further comprising a magnetic tray attached to the handle.

23. The modular fishing equipment cart according to claim 22, further comprising a shelf assembly releasably attachable to the rear lateral side.

24. The modular fishing equipment cart according to claim 23, wherein the shelf assembly has a plurality of hollow legs, each of the legs being adapted to retain a fishing rod.

25. The modular fishing equipment cart according to claim 1, further comprising a sink removably attached to the frame.

\* \* \* \* \*